(12) United States Patent
Jack et al.

(10) Patent No.: US 7,132,655 B2
(45) Date of Patent: Nov. 7, 2006

(54) PASSIVE MILLIMETER WAVE SENSOR USING HIGH TEMPERATURE SUPERCONDUCTING LEADS

(75) Inventors: Michael D. Jack, Goleta, CA (US); Eli E. Gordon, Santa Barbara, CA (US)

(73) Assignee: Raytheon Company, Waltham, MA (US)

( * ) Notice: Subject to any disclaimer, the term of this patent is extended or adjusted under 35 U.S.C. 154(b) by 321 days.

(21) Appl. No.: 10/727,187

(22) Filed: Dec. 2, 2003

(65) Prior Publication Data
US 2004/0140429 A1 Jul. 22, 2004

Related U.S. Application Data
(60) Provisional application No. 60/430,599, filed on Dec. 2, 2002.

(51) Int. Cl.
*G01J 5/00* (2006.01)
(52) U.S. Cl. ................................ 250/338.1; 250/336.2; 250/338.4
(58) Field of Classification Search ............. 250/338.4, 250/338.1, 338.14, 338.18, 336.1, 370.01, 250/336.2; 338/14, 18; 505/161
See application file for complete search history.

(56) References Cited

U.S. PATENT DOCUMENTS

| | | | | | |
|---|---|---|---|---|---|
| 5,171,733 | A | * | 12/1992 | Hu | 505/161 |
| 5,399,897 | A | | 3/1995 | Cunningham et al. | 257/467 |
| 5,450,053 | A | | 9/1995 | Wood | 338/18 |
| 5,688,699 | A | | 11/1997 | Cunningham et al. | 437/3 |
| 5,808,350 | A | | 9/1998 | Jack et al. | 257/440 |
| 5,850,098 | A | * | 12/1998 | Butler et al. | 257/467 |
| 6,292,140 | B1 | * | 9/2001 | Osterman | 343/700 MS |
| 6,316,770 | B1 | * | 11/2001 | Ouvrier-Buffet et al. | 250/338.1 |
| 6,329,649 | B1 | | 12/2001 | Jack et al. | 250/250 |
| 6,329,655 | B1 | | 12/2001 | Jack et al. | 250/338 |
| 6,441,368 | B1 | | 8/2002 | Grinberg et al. | 250/239 |
| 6,459,084 | B1 | * | 10/2002 | Boreman et al. | 250/349 |
| 6,777,684 | B1 | * | 8/2004 | Volkov et al. | 250/341.1 |
| 2003/0222217 | A1 | * | 12/2003 | Luukanen | 250/336.2 |
| 2005/0067576 | A1 | * | 3/2005 | Caria | 250/370.08 |

OTHER PUBLICATIONS

Rice et al., "High-Tc Superconducting Antenna-Coupled Microbolometer on Silicon", SPIE Proceedings, The International Society for Optical Engineering U.S.A., 1994, vol. 2159, pp. 98-109, XP009041389.*
"Pulsed Electron Deposition (PED)", www.neocera.com for PED (pulsed electron deposition), web pages printed Apr. 28, 2003, 3 pages.

* cited by examiner

*Primary Examiner*—David Porta
*Assistant Examiner*—Faye Boosalis
(74) *Attorney, Agent, or Firm*—William C. Schubert; Karl A. Vick

(57) ABSTRACT

A radiation sensor (20) has a substrate (34); an antenna (24) coupled to the substrate (34), a thermal detector unit TDU (22) spaced from the antenna (24) and the substrate (34); and a multi-layered conductive lead (30). The conductive lead (30) physically contacts the antenna (24) and the TDU (22). The conductive lead (30) defines a support layer (44) adjacent to the substrate (34) for structurally supporting the TDU (22) over a cavity defined by the substrate (34), a buffer layer (46) disposed on the support layer (44), and a superconductive layer (48) disposed on the buffer layer (46). The buffer layer has a crystalline structure to facilitate bonding with other layers. A method for making the sensor (20) is disclosed wherein the superconductive layer (48) and the buffer layer (46) are deposited using laser deposit, the buffer layer (46) with ion beam assist for alignment.

13 Claims, 4 Drawing Sheets

| | A | B | C | D | E | F | G |
|---|---|---|---|---|---|---|---|
| CONDUCTIVE/HTS | CONDUCTIVELY COUPLED WITH NORMAL METAL 25 MICRONS | NORMAL METAL COOL TO 77K | HTS ANTENNA TO LOAD CONNECTION 25 MICRONS | HTS ANTENNA TO LOAD CONNECTION 25 MICRONS | HTS ANTENNA TO LOAD CONNECTION 15 MICRONS | HTS ANTENNA TO LOAD CONNECTION 10 MICRONS | HTS ANTENNA TO LOAD CONNECTION 5 MICRONS |
| NEP(pW) SYSTEM | 300 | 100 | 0.9 | 0.25 | 0.1 | 0.06 | 0.016 |
| NEP(pW) | 210 | 68 | 0.61 | 0.17 | 0.068 | 0.041 | 0.011 |
| NEP(pW) AVERAGED (N TIMES) | $\frac{210}{(\sqrt{49})}=30$ | $\frac{68}{(\sqrt{125})}=6.1$ | 0.61 | 0.17 | | 0.041 | 0.011 |
| TEMPERATURE (K) | 300 | 77 | 77 | 77 | 77 | 77 | 40 |
| UNIT CELL WIDTH (um) | 25 | 25 | 25 | 25 | 15 | 10 | 5 |
| FILL FACTOR (%AREA) | 95 | 95 | 95 | 95 | 95 | 95 | 95 |
| BRIDGE Si3N4 Eff THICKNESS (Å) | 6000 | 6500 | 2000 | 500 | 500 | 500 | 500 |
| LEG SiNi THICKNESS (Å) | 6000 | 6000 | 5000 | 1750 | 1500 | 400 | 200 |
| LEG METAL THICKNESS (Å) | 2000 | 2000 | 5000 | 2000 | 1000 | 400 | 200 |
| LEG WIDTH (um) | 10 | 10 | 1 | 1 | 0.5 | 0.5 | 0.5 |
| LEG LENGTH (um) | 25 | 25 | 250 | 250 | 250 | 250 | 500 |
| TCR %/K | 2.4 | 2.4 | 2.4 | 2.4 | 10 | 2.4 | 2.4 |
| BOLOMETER RESISTANCE (ohms) | 50,000 | 50,000 | 99,200 | 99,200 | 99,200 | 248,000 | 248,000 |

FIG.4

PASSIVE MILLIMETER WAVE SENSOR USING HIGH TEMPERATURE SUPERCONDUCTING LEADS

PRIORITY STATEMENT

This application claims priority to Provisional U.S. Patent Application No. 60/430,599, filed on Dec. 2, 2002, which is hereby incorporated by reference in its entirety.

TECHNICAL FIELD

These teachings relate generally to sensors for detecting incident radiation defined by millimeter-range or infrared wavelengths. It is particularly directed to materials and fabrication methods for resistive coupling between a thermal sensor and an antenna of such a sensor.

BACKGROUND

Millimeter wave (MMW) frequency bands span from approximately thirty GHz to over one THz. There are inherent advantages in sensing such frequency bands: all natural objects whose temperatures are above absolute zero emit passive MMW radiation, images produced by MMW may have a more natural appearance than from infrared (IR) waves, and MMWs are attenuated to a much lesser degree than visible or IR wavelengths in the presence of fog, cloud cover, snow, dust and rain. As used herein, IR includes radiation defined generally by wavelengths $0.7 \ \mu m < \lambda_{IR} < 30 \ \mu m$; and MMW includes radiation defined generally by wavelengths $280 \ \mu m < \lambda_{MMW} < 1.5 \ cm$. Energy in the MMW region is approximately $10^8$ times less than that emitted in the longer wavelengths of the IR region, current MMW receivers substantially offset that disadvantage through larger pixel size ($10^4$) and temperature contrast (about $10^3$ times better) as compared to typical IR sensors. The use of MMW detection has applications in aviation (airport/aircraft safety, all-weather vision), medical and plasma diagnostics, non-destructive testing for voids and delaminations within composite materials, remote sensing of agricultural and environmental conditions, and a wide variety of defense, counter-terrorism, and law enforcement applications.

In previous implementations (see for example, U.S. Pat. No. 6,329,655, herein incorporated by reference), MMW sensors use one, or more often an array of thermal detectors, specifically bolometers, that each provide a pixel input into a resulting image of the radiation sensed. Each thermal detector converts absorbed electromagnetic energy into an electrical signal. Since MMW radiation typically generates a low level signal, thermal insulation of each bolometer is critical to ensure the MMW signal is differentiable from noise. Typically, each bolometer is suspended by a microbridge in a non-contact position over a substrate on which they are mounted, and the microbridge is supported by conductive leads or legs. Sensors of this type are fabricated using fine patterning, micromachining or photolithography techniques. To maintain thermal isolation of each bolometer from one another and from the substrate, while ensuring coupling of the bolometer to the frequency band sought to be absorbed, antennas tailored for the desired frequency band are married to each bolometer. For MMW, the antenna and the bolometer may be disposed on the same side of a substrate.

There are generally two disparate architectures by which MMW sensors having both a sensing antenna and a bolometer have proceeded: capacitive coupling and resistive coupling. Capacitive coupling is a recent approach (e.g., U.S. Pat. No. 6,329,655) whereby opposed ends of the microbridge overlie opposed portions of an antenna, and are spaced therefrom by a gap, preferably 0.2–1.0 microns. Inductance across the gaps at opposed ends drives a current through the bridge on which the bolometer lies. Incident radiation causes temperature fluctuations within the bolometer, which are transferred to the bridge. These temperature changes register as changes in the resistance of the bridge, which is the measure of incident radiation (plus any system noise).

Capacitive coupling generally provides improved sensitivity over resistive coupling, but that advantage is offset by limits on miniaturization. Specifically, capacitive coupling requires a substantial overlap area between the bridge and the antenna such that coupling capacitive impedance ($2/2\pi f C A_{overlap}$) must remain small compared to the load impedance (100–300 Ohms) in order to be effective. Capacitive coupling efficiency scales positively with smaller gaps between the bridge and the antenna in the overlap areas. For example, for a gap of 0.1 microns, a load resistance of 100 Ohms and an incident radiation frequency of 100 GHz, maximum coupling efficiency is approximately 30% for a bridge spanning 50 microns, and approximately 70% for a bridge spanning 100 microns. A more conservative gap of 0.5 microns reduces the coupling efficiency to about 5% for the 50-micron bridge and to about 30% for the 100-micron bridge. These represent the coupling efficiency for the most optimum frequencies. To overcome this disadvantage, capacitively coupled sensors must ensure sufficient overlapping surface area ($A_{overlap}$) at each opposed end of the bolometer bridge. Considering that most applications use arrays of multiple MMW sensors deployed on a single substrate, the requirement for high $A_{overlap}$ limits each sensor to a minimum size and correspondingly limits their practical utility in densely packed array formats.

Resistive coupling is the more traditional architecture for MMW sensors, wherein the bridge comprises a conductor such as NiCr (hereinafter, nichrome) that physically contacts each opposed portion of the antenna. While the effective coupling efficiency for resistively coupled sensors is approximately three times that for capacitively coupled sensors, sensitivity is reduced by a factor of ten to twenty as compared to capacitive architecture. Heat transferred through legs of the nichrome bridge is a source of electromagnetic noise to the temperature-sensitive bolometer. That noise reduces the sensitivity of the sensor. The above limitation was the motivation behind developing capacitive coupling.

What is needed in the art is a sensor for MMW detection and preferably also IR detection that maintains an efficient coupling of the thermal detector to the radiation wavelength of interest, that offers a high degree of sensitivity to resolve scene radiation while limiting noise levels, and that can be miniaturized without substantial performance penalty. An efficient method of making such a sensor, and arrays of such sensors, is also needed.

SUMMARY OF THE PREFERRED EMBODIMENTS

The foregoing and other problems are overcome, and other advantages are realized, in accordance with the presently preferred embodiments of these teachings. In accordance with one aspect of the present invention, a radiation sensor includes a substrate, an antenna, a thermal detector unit, and a multi-layered conductive lead. The antenna is coupled to the substrate, and the thermal detector unit is spaced from both the antenna and from the substrate. Preferably, the thermal detector unit is suspended by a plurality of the multi-layered conductive leads over a cavity defined by the substrate. Each conductive lead is in contact with the antenna and the thermal detector unit, preferably in direct physical contact so that the antenna and the thermal detector unit are resistively coupled, as opposed to capacitively or inductively coupled. The multi-layered conductive lead defines at least two layers: a superconductive layer and a support layer. Preferably, the support layer is disposed between the superconductive layer and the substrate. Neither layer is in direct contact with the substrate to facilitate thermal isolation of the thermal detector unit from the substrate. The superconductive layer is in electrical contact with the thermal detector unit and the antenna, and conducts electrical currents between them. An electrically conductive pathway is established between the superconductive layer and each of the antenna and the thermal detector unit by an electrically conductive bond such as overlapping thin films, solder, thermal paste, or other conductive adhesive.

Preferably, the superconductive layer is a high temperature superconductor defining a critical temperature $T_c$, below which the superconductive layer exhibits resistance of zero, or substantially zero. Operation of the sensor is maximized at temperatures at or below $T_c$. A buffer layer is preferably disposed between the support layer and the superconductive layer to facilitate bonding. The buffer layer preferably exhibits a crystalline structure to bond with the superconductive layer, and preferably also defines a thermal conductivity no higher than that of the superconductive layer. In one particular embodiment, four conductive leads suspend the thermal detector unit over a cavity defined by the substrate, the buffer layer is comprised of yttrium stabilized zirconium, and the superconductive layer is comprised of a perovskite superconductor, such as $YBa_2Cu_3O_{7+\delta}$, wherein $0.0 \leq \delta < 1.0$.

Another aspect of the present invention is a method for making a radiation sensor. The method includes defining a cavity within a substrate and depositing a filler material within the cavity. A thermal detector unit is then deposited onto the filler material, preferably by depositing a thermally reactive material over at least a portion of the filler material, delineating edges of the thermal detector unit, and removing any excess thermally reactive material. Prior to, subsequent to, or synchronous with depositing the thermal detector unit, an antenna is deposited onto the substrate, preferably by depositing a conductive material such as gold, copper or aluminum onto the substrate, delineating antenna edges, and removing any excess conductive material.

Once the antenna and the thermal detector unit are deposited, the method includes depositing a multi-layer conductive lead to contact the thermal detector unit and the antenna. The multi-layer conductive lead comprises a layer of superconductive material. Preferably, depositing the conductive lead includes depositing at least three disparate layers one on top of another: a layer of support material, a layer of buffer material, and a layer of superconductive material, in that order, so that the support layer contacts both the antenna and the thermal detector unit. The buffer layer is preferably laser deposited, and the buffer material is preferably laser deposited with ion beam assist to assure proper alignment. Edges of the conductive lead or leads are then delineated by removing any excess support material, any excess buffer material, and any excess superconductive material. The method includes conductively bonding each of two opposed ends of the conductive lead, preferably after delineating edges of the conductive lead(s). Each conductive bond provides an electrically conductive pathway between the superconductive material and either the antenna or the thermal detector unit. The conductive bond is preferably formed by the thin film deposition. The filler material is then removed so that the thermal detector unit is preferably suspended over the cavity by the conductive leads. The present invention also includes arrays of sensors as described above, and a method of making an array of such sensors.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIG. 4 is a table comparing performance between a prior art sensor and various sensors according to the present invention.

DETAILED DESCRIPTION OF THE PREFERRED EMBODIMENTS

Figure 1:
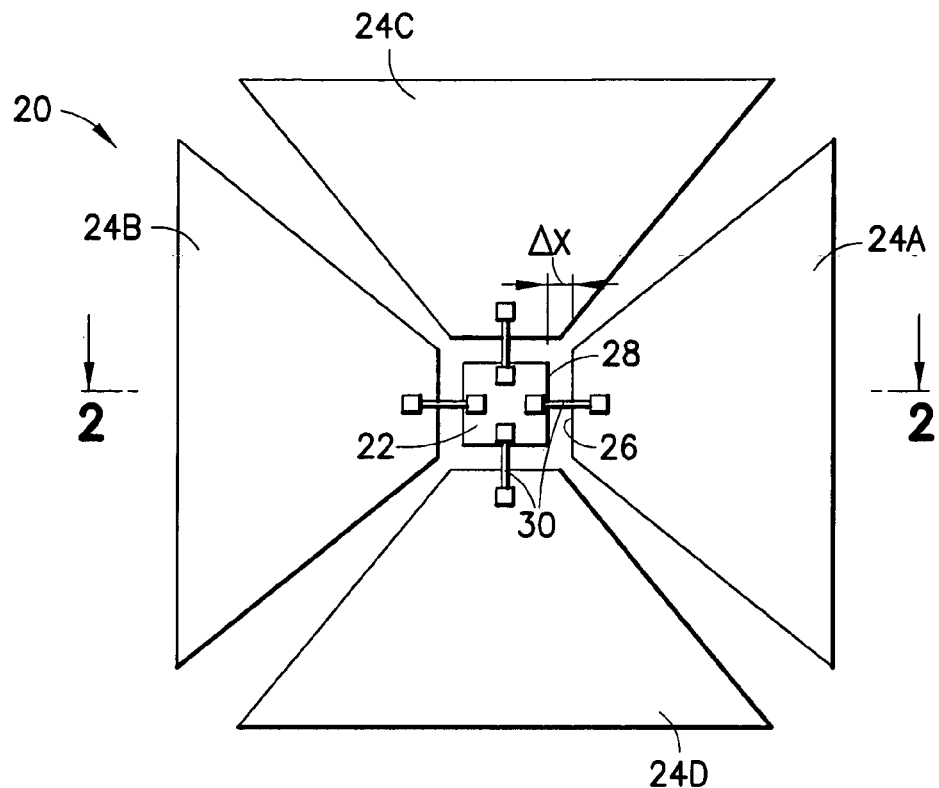
FIG. 1 is an overhead view of a radiation sensor according to the preferred embodiment of the present invention.

The present invention is best understood when considered with reference to the drawings, wherein the (not to scale) drawings are directed to particular embodiments intended to illustrate but not limit the ensuing claims. In accordance with the preferred embodiment of the present invention, FIG. 1 depicts in overhead view a radiation sensor 20. A thermal detector unit 22 is disposed in the center of a multi-segment antenna 24. The thermal detector unit 22 may be a bolometer, a pyroelectric element, a thermopile element, or any suitable thermal sensing element. A typical thermal detector unit defines a multilayer structure wherein a film of vanadium oxide is supported on a bridge isolated layer of a material such as silicon nitride. The antenna 24 preferably defines an orthogonal pair of planar full-wave dipoles (a crossed bowtie configuration) as described in U.S. Pat. No. 5,450,053 (herein incorporated by reference) and in co-owned U.S. Pat. No. 6,329,655. Such a configuration is particularly adapted to be responsive to a particular frequency band of incident radiation. The antenna 24 may define other configurations or shapes, such as a spiral coil, as may be appropriate for a particular radiation frequency band of interest. Particular frequency bands of interest include bands centered at approximately 35 GHz, 94 GHz, 140 GHz, and 220 GHz. The antenna 24 may alternatively be located at some distance from the detector 22. The antenna 24 is typically fabricated from a conductive metal such as aluminum or copper.

For the crossed bowtie configuration selected for illustration, the antenna 24 is divided into pairs of opposed trapezoidal leaves 24A–24B and 24C–24D. Each leaf 24A, 24B of one pair is orthogonal to each leaf 24C, 24D of the other pair. Preferably, each of the trapezoidal leaves 24A–24D define a distance Δx between an inward facing edge or surface 26A–26D of each respective leaf 24A–24D and an adjacent edge or surface 28 of the thermal detector unit 22. The distance Δx is sufficient to prevent non-contact electrical communication between the thermal detector unit 22 and the antenna 24 over the expected operating parameters of the sensor 20, and the measure of Δx is preferably constant between a single trapezoidal leaf 24A–24D and the adjacent side 28. The distance Δx is preferably also constant between each leaf 24A–24D and the respective adjacent edge 28 of the thermal detector unit 22. A plurality of conductive leads 30 are disposed to connect the thermal conductor 22 electrically to each of the trapezoidal leaves 24A–24D, and preferably each conductive lead 30 so connects one unique leaf 24A–24D.

Figure 2:
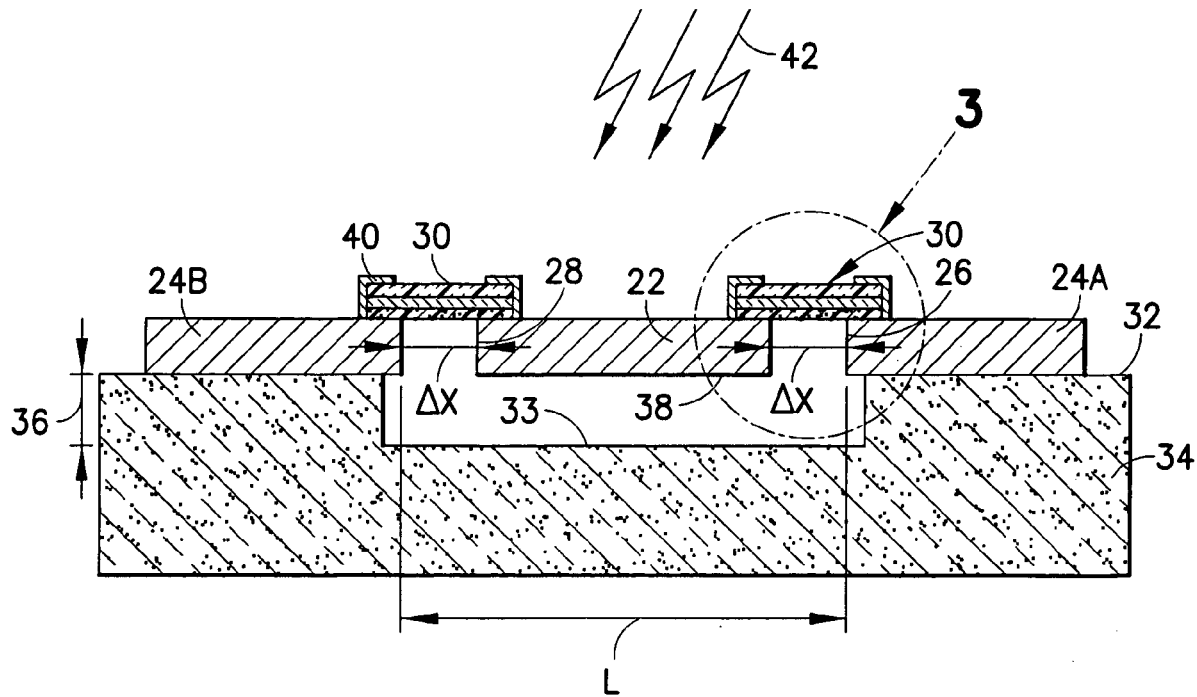
FIG. 2 is a sectional view taken along section line 2—2 of FIG. 1.

FIG. 2 is a sectional view taken along section line 2—2 of FIG. 1. The entire radiation sensor 20 is preferably disposed within a low-pressure chamber (not shown) with a protective lens to isolate the sensor 20 from environmental stresses and noise, as is known in the art. The thermal detector unit 22 is shown spaced a distance Δx from each of the antenna leaves 24A and 24B. The antenna leaves 24A, 24B are disposed on a first surface 32 of a substrate 34 such as silicon oxide. Incident radiation 42 is incident upon the thermal detector unit 22 and the antenna 24. The substrate 34 acts as a heat sink for the antenna 24 so that thermal transfer from the antenna 24 to the thermal detector unit 22 is limited or prevented over expected operating conditions.

The thermal detector unit 22 is isolated from the heat-sinking substrate 34 by mounting it so as to define a gap 36 between a recessed surface 33 of the substrate 34 and an adjacent surface 38 of the thermal detector unit 22. The thermal detector unit 22 is suspended over an unfilled cavity defined by the gap 36 as is known in the art (see U.S. Pat. Nos. 5,450,053 and 6,329,655, for example). In a preferred embodiment of the present invention, the thermal detector unit 22 is suspended over the cavity defined by the substrate 34 by the conductive leads 30, which are in tension and which lie parallel to the first surface 32 of the substrate 34. The antenna 24 is connected electrically to the thermal detector unit 22 by the conductive leads 30. Each opposed end of the conductive lead 30 is fixed to one of the thermal detector unit 22 or antenna 24 by a conductive bond 40, which is formed by thin film deposition.

Figure 3:
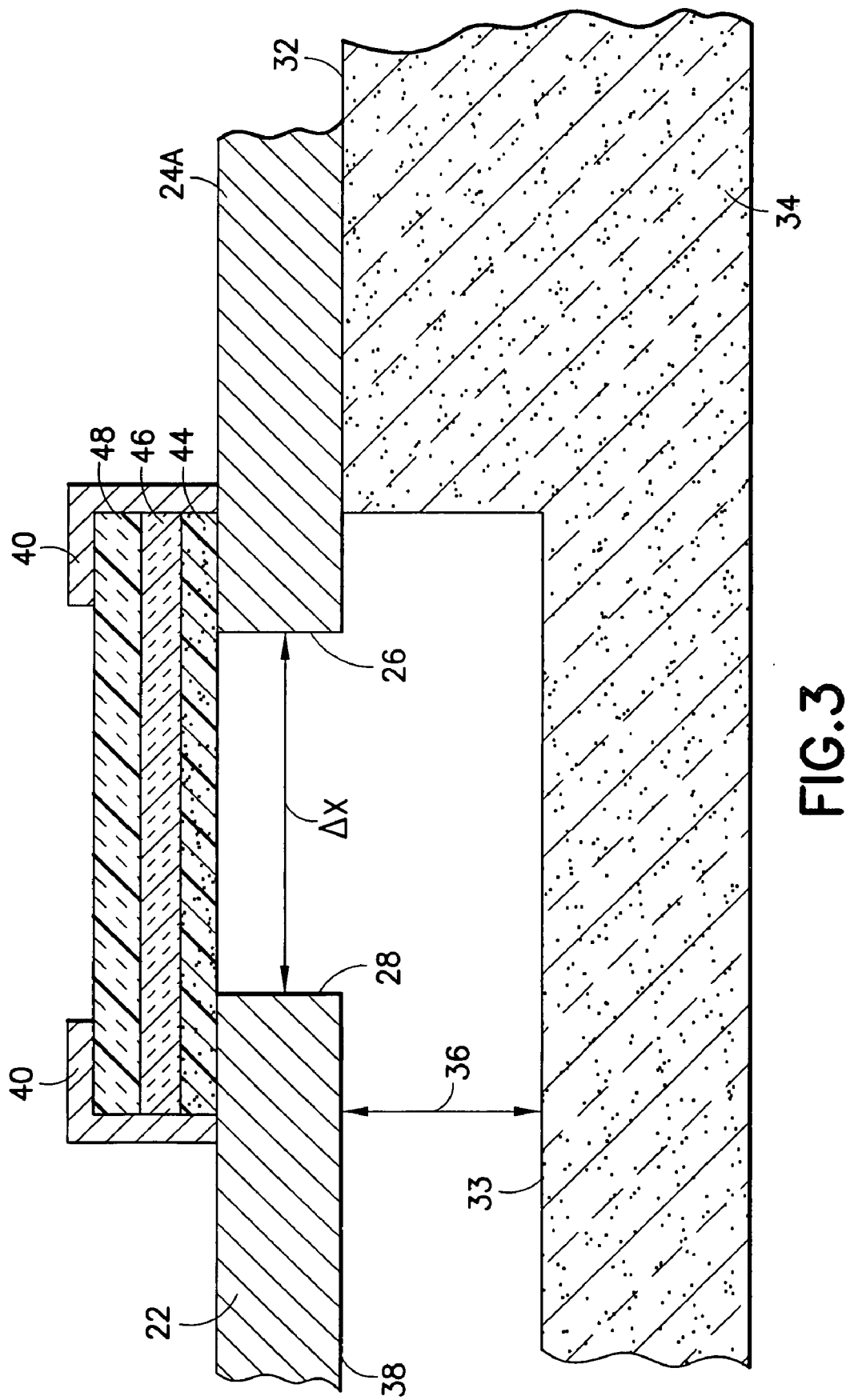
FIG. 3 is a plan view depicting a conductive lead within the encircled portion of FIG. 2.

The conductive lead 30 is a multi-layer structure depicted in plan view at FIG. 3, which is an isolation view of the encircled area of FIG. 2. In FIG. 3, the bottom of the substrate 34 is depicted for context though not encircled in FIG. 2. The conductive lead 30 is in three layers: a support layer 44 that is preferably amorphous, a buffer layer 46, and a superconductive layer 48. The support layer 44 is preferably silicon nitride $Si_3N_4$ that gives structural integrity to the conductive lead 30 and is sufficiently strong in tension to support the thermal detector 22 in suspension. During fabrication, the conductive leads are preferably sputter deposited onto a sacrificial oxide fill material that fills the cavity defined in the substrate 34. In the completed sensor 20, the fill material is removed and the plurality of conductive leads 30 supports the thermal detector unit 22 over the cavity and the recessed surface 33 of the substrate 34.

The superconductive layer 48 is the primary conduit of electrical communication between the antenna 24 and the thermal detector unit 22. Each of the conductive bonds 40 serve as an electrical conduit between the superconductive layer 48 and either the antenna 24 or the thermal detector unit 22. Because superconductivity (the property of zero or essentially zero electrical resistance) is dependent upon temperature and possibly pressure, the term superconductive layer 48 does not necessarily mean the layer exhibits superconductivity in any or all practical applications of the sensor 20, but rather that the material comprising the superconductive layer 48 is recognized as a superconductor when certain conditions of temperature and pressure are satisfied. Those conditions need not be consistent with operating conditions of the sensor 20. Preferably, the sensor 20 is operated at temperatures below the critical temperature, explained below, to achieve zero or near-zero resistance.

Preferably, the material of the superconductive layer 48 is from the family of perovskite superconductors. Perovskite superconductors are metal-oxide ceramics characterized by electrical superconductivity when at temperatures below a critical temperature $T_c$. $T_c$ may vary with pressure, and most published $T_c$'s presume atmospheric or ambient pressure. For the purposes of this disclosure, $T_c$ shall mean the critical temperature adjusted for pressure. Critical temperature varies for different perovskite superconductors, but they are within a class designated high critical temperature superconductors ($HT_cS$). Superconductors defined by a $T_c$ greater than about 30K (−253° C.) are considered $HT_cS$. Perovskite superconductors generally have a ratio of two metal atoms to three oxygen atoms, but there are numerous exceptions such as cuprate perovskites (e.g., $La_2Ba_2CaCu_5O_{7+\delta}$, $[Sr,Ca]_5Cu_4O_{10}$, $[Ba,Sr]CuO_2$, etc.). It has been found that certain elements in small amounts (such as doping calcium of a $HT_cS$ with small amounts of yttrium or doping barium of a $HT_cS$ with small amounts of lead) increase the critical temperature of certain superconductors. For the purposes of this disclosure and the ensuing claims, compounds comprising such nominal additions are included within the definition of perovskite superconductor so long as the compound remains a perovskite superconductor absent the additional nominal additional element. In a most preferred embodiment, the superconductive layer 48 is $YBa_2Cu_3O_{7+\delta}$, wherein $0.0 \leq \delta < 1.0$, hereinafter referred to as YBCO.

Generally, normal conductors (i.e., non superconductors) follow the Wiedermann-Franz law which states $K=TL/\sigma$, wherein K is thermal conductivity, T is temperature in Kelvin, L is a Wiedermann-Franz constant, and $\sigma$ is electrical conductivity. The Wiedermann-Franz law posits proportionality between thermal conductivity K and electrical conductivity $\sigma$, and holds particularly well for metals whose thermal conductivity is dominated by electron conduction. As an example, nichrome is commonly used in prior art resistively coupled IR or MMW sensors for the leg/bridge structure, wherein the leg/bridge structure conducts electricity between an antenna and a bolometer. Nichrome defines $K=0.05$ W/cm-K, $\sigma=10^4$ (ohm-cm)$^{-1}$, and $L^{effective} \approx 1.667 \times 10^{-8}$ at T=300K, relatively close to the theoretical value of $L=2.45 \times 10^{-8}$ watt-ohm/degree$^2$. For alloys or thin metals, temperature dependence of electrical conductivity is relatively constant, so the Wiedermann-Franz law and experimentation show that thermal conductivity falls linearly with falling temperature, at least to about 70K. Thermal conductivity of metals, in general, slowly decreases as temperature decreases to about 70K, and then increases sharply as the temperature decreases further to about 10K.

At least at the critical temperature and below, superconductors do not follow the Wiedermann-Franz law. Thermal conductivity remains low while electrical conductivity approaches infinity. For YBCO, $T_c=90K$, $\sigma=10^{-6}$ ohm-cm at 100 GHz, and $K \sim 0.01$ W/cm-K. Historically, perovskite superconductors have good properties including essentially zero electrical resistance from DC to millimeter wave frequencies only when they are deposited on single crystal materials. Single crystal materials inherently exhibit high thermal conductivity, so a conductive lead comprising a superconductive layer disposed on a single crystal layer would exhibit both an advantageous high electrical conductivity (the superconductive layer) and a disadvantageous high thermal conductivity (the single crystal layer). To deposit a superconductor on such a single crystal substrate would defeat the desirable superconductor property of low thermal conductivity.

Single crystal materials are also not particularly compatible with processing and fabrication techniques used for making uncooled (non cryogenically cooled) radiation sensors. Specifically, single crystal materials are typically grown in place at high temperatures as an epitaxial layer. For a MMW or IR sensor, that would entail growing the layer while in contact with the antenna and the thermal detector, and the high temperature would render the thermal detector, and thus the sensor itself, inoperable.

Additionally, $HT_cS$ are extremely brittle and difficult to fabricate without the presence of defects. Defects typically include occlusions and barriers that inhibit the flow of superconductive current, even if the defect spans only a few atomic layers. Most if not all known $HT_cS$ consist of $CuO_2$ sheets separated by insulating oxide layers. The apparently dominant theory that explains superconductivity is that it is induced by charge transfer between the insulating layers and the $CuO_2$ sheets. For p-type superconductors such as YBCO, the charge carriers are holes in the valence band that has predominantly oxygen 2-p state strongly hybridized with the copper 3-d state. If the above theory is correct, a defect spanning only two adjacent sheets will frustrate superconductivity in that region, and a plurality of atomic level defects can inhibit superconductivity over an entire structure. SEM micrographs appear to show such atomic level defects that may be responsible for loss of electrical conductivity. As such, superconductors have not generally been viewed in the art as feasible for MMW or IR sensors.

The buffer layer 46 is imposed between the support layer 44 and the superconductive layer 48 to aid in overcoming at least some of the above problems, and without the disadvantages of an epitaxial layer described above. The buffer layer preferably exhibits two qualities: it has low thermal conductivity, and it is crystalline as applied to the support layer 44. In order not to undermine the low thermal conductivity of the superconductive layer 48, the buffer layer preferably defines a thermal conductivity K within about an order of magnitude of the thermal conductivity defined by the superconductive layer 48. Most preferably, the buffer layer 46 defines a thermal conductivity K no higher than that of the superconductive layer 48. In the preferred embodiment, the buffer layer 46 comprises yttria stabilized zirconia (YSZ). During fabrication of the conductive leads 30, YSZ is deposited on the support layer 44 using an ion beam to maintain some degree of crystalline alignment. YSZ defines a thermal conductivity $K \sim 0.01$–$0.02$ W/cm-K, which is slightly lower than that for YBCO.

Because resistance in normal metals declines with temperature only to about 70K and a sensor according to the present invention employs normal metals (as the conductive bond 40 and possibly as a support bridge for the thermal detector unit 22), an ideal superconductor would define $T_c$>70K. Recent advances have identified several such superconductors, with the highest $T_c \sim 138K$ ($Hg_{0.8}Tl_{0.2}Ba_2Ca_2Cu_3O_{8.33}$)

The present invention also includes a novel method for making a sensor 20 or an array of sensors 20. As noted above, prior art fabrication techniques have included, alone or in combination, micro-machining, etching, and photolithography in multiple steps. The present invention remains a multi-step process, but improves upon those prior art methods by making fabrication more efficient, and allowing much more miniaturized sensors. Miniaturization is improved over capacitively coupled sensors by employing a resistively coupled design for a sensor employing a superconductor layer 48. Better thermal isolation of conductive leads 30 enables closer tolerances between the thermal detector 22 and the antenna 24, and conductive leads 30 that are both shorter and thinner than would be operable using normal metals such a nichrome.

The method for fabricating the present invention includes defining a cavity in a substrate 34, preferably by etching using a wet, reactive ion, or ion bombardment process. The cavity is then filled with a sacrificial oxide material that is used to support the thermal detector unit 22 during fabrication, as known in the art. Preferably, the cavity is slightly overfilled and the surface is subsequently planarized to remove any excess, exposing the first surface 32 of the substrate 34 and providing a planar, continuous surface for fabrication. Once the first surface 32 is prepared, a highly conductive metal such as gold, copper, or aluminum is deposited upon the first surface 32, and the antenna 24 is delineated therefrom using etching or any other prior art techniques, and any excess metal is removed. A portion of the antenna 24 may overlie the sacrificial oxide material and the cavity. A layer of thermally reactive material is deposited on the sacrificial oxide material, the thermal detector unit 22 is delineated therefrom, and any excess is removed. The support layer 44 is deposited in the desired areas, preferably by sputtering. The buffer layer 46 is deposited onto the support layer 44, preferably using an ion beam assist to attain alignment. The superconductor layer 48 is deposited onto the buffer layer 46, preferably using a deposition technique such as pulsed electron deposition PED (high power electron beam). A PED uses a high energy electron beam that penetrates into a target (the buffer layer) in a manner that results in evaporation of a thin layer of the target material, non-equilibrium heating of the target, and stochiometric ablation of the target. Alternative techniques such as laser ablation, or sputter deposition may be utilized. The conductive legs 30 are masked and delineated, preferably using an ion beam etch. A conductive adhesive, such as a normal metal, is preferably lift-off deposited to form a conductive bond 40 that is a direct electrical contact between one end of the superconductive layer 48 and the antenna 24, and between the opposed end of the superconductive layer 48 and the thermal detector unit 22. Preferably as the last step, the sacrificial oxide fill layer is removed via etching or other means, leaving the thermal detector unit 22 suspended by the conductive leads 30.

FIG. 4 is a table comparing performance between a prior art sensor using nichrome legs and bridge (T=300 and 77K) and various sensors according to the present invention (T=77K) with different scaling. NEP is noise equivalent power (the signal power that is equivalent to noise in the system or device), TCR % is temperature coefficient of resistance in percent, and the micron measurement recited in the header of each column corresponds to the length L depicted in FIG. 2, the span between inward facing edges 26 of opposed leafs of the antenna 24. This length L applies to any sensor on a bridge and/or supported by legs or conductive leads. Even without the scaling advantages (comparing column B to column C), at 77K the $HT_cS$ sensor 20 defines a $NEP_{system}$ more than 100 times lower than that of the prior art. Column D uses thinner layers of YBCO and YSZ.

System NEP as low as about 0.016 picowatts (pW) at column G is achievable with the present invention by exploiting miniaturization to a scale not previously possible with conventional conductors.

Figure 5:
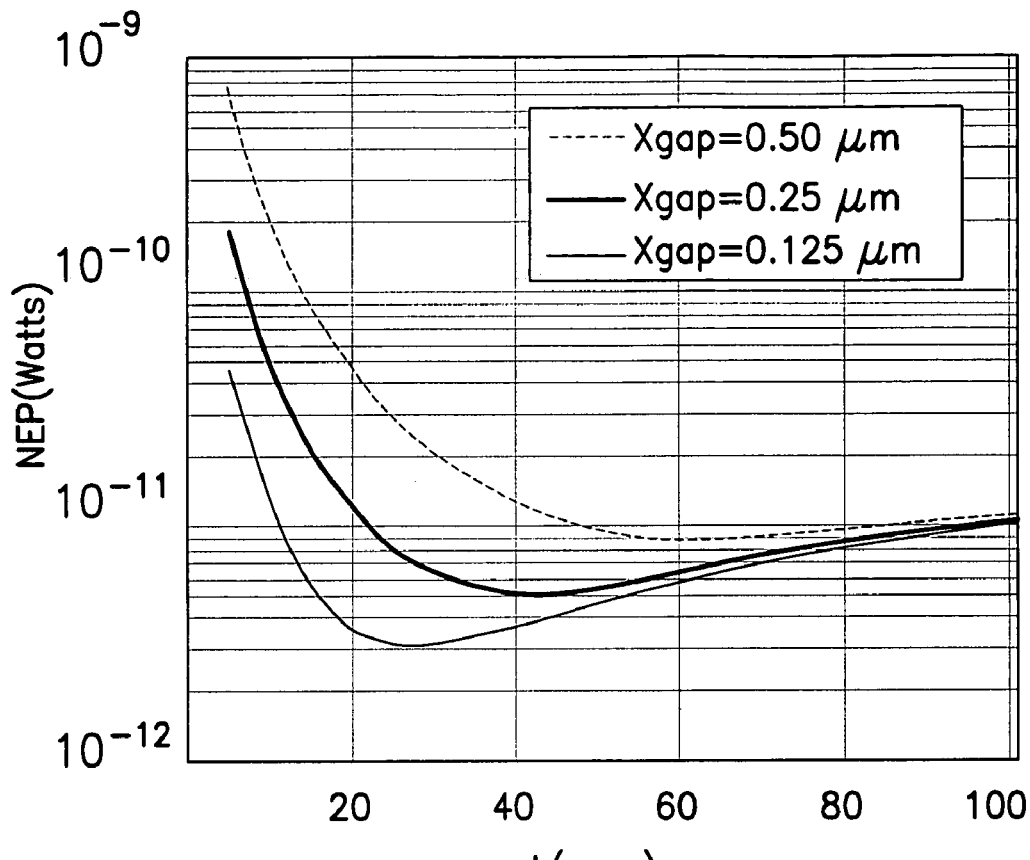
FIG. 5 is a graph of NEP in watts versus bridge length for a conductively coupled sensor of the prior art.
Figure 6:
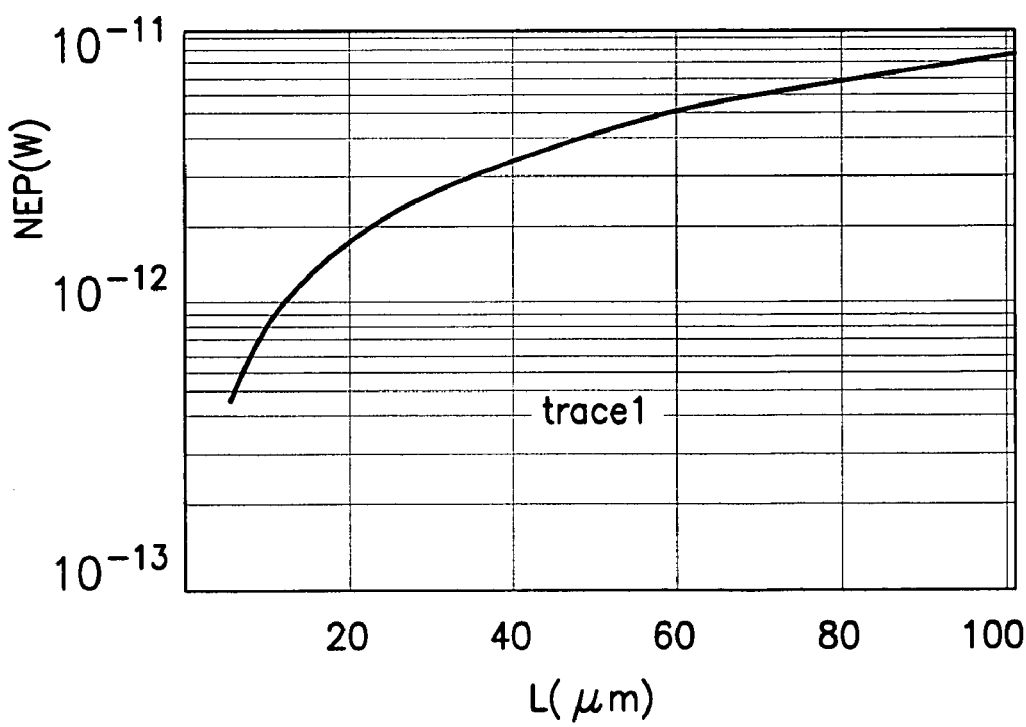
FIG. 6 is a graph of NEP in watts versus bridge length for a resistively coupled sensor according to the present invention.

Advantages in scalability are also evident when comparing FIGS. 5 and 6. Both graphs are calculated using the Approximate Equation for Coupling at 80K. FIG. 5 is a graph of NEP in watts versus bridge length (L of FIG. 2) for three different values of $x_{gap}$ (the z-direction distance between the antenna and the thermal sensor at the overlap area) for a conductively coupled sensor. Scaling to smaller dimensions improves performance as the radiative conductance decreases, and then dramatically degrades performance as the coupling efficiency drops dramatically. In FIG. 5, leg length is adjusted to achieve a uniform detector time constant $\tau=C/G$ of 25 msec, and leg width=2 microns and nitride thickness=1 micron is assumed. For a 0.25 micron gap and L=40 microns, $NEP_{system} \sim 5$ pW. However, a leg length of 50 microns is required to achieve the 25 msec time constant that is generally required for real time imaging. Further miniaturization may reduce the $NEP_{system}$ to approximately 1 pW, but would require a 400 micron leg length that renders the sensor much more prone to failure during normal use.

FIG. 6 is a graph of NEP in watts versus bridge length for a resistively coupled sensor according to the present invention. Further miniaturization continually improves performance even slightly below L=5 microns. $NEP_{system}=1.3$ pW for a sensor wherein nitride leg, $HT_cS$ layer, and bridge thickness each equal 1 micron, and leg length=140 microns. Further scaling to reduce the effective bridge thickness by a factor often would require a support disposed within the cavity, such as a novel eggcrate structure which preserves support while maintaining efficient coupling. Such scaling would enable an $NEP_{system}=0.4$ pW. For purposes of this disclosure and the ensuing claims, a cavity defined by the substrate 34 is not negated by the presence of a support structure such as an eggcrate or other such body that fails to completely fill what is otherwise an unequivocal cavity. There are three techniques to achieve the $NEP_{system}=0.4$ pW result using currently available technology: 1) given $HT_cS$ and nitride thickness ~1 micron, lengthen the conductive leads 30 to ~1000 microns; 2) use a shorter leg length and sample the bridge multiple times rather than once per frame (achievable since $\tau$ is much faster than 25 msec, the generally accepted minimum for real-time imaging); or 3) reduce leg cross section (thickness or preferably width) to about half (0.5 microns) and increase the leg length to 250 microns.

While described in the context of presently preferred embodiments, those skilled in the art should appreciate that various modifications of and alterations to the foregoing embodiments can be made, and that all such modifications and alterations remain within the scope of this invention. Examples herein are stipulated as illustrative and not exhaustive.

What is claimed is:

1. A radiation sensor comprising:
   a substrate defining a cavity;
   an antenna coupled to the substrate;
   a thermal detector unit spaced from the antenna and from the substrate;
   a plurality of multi-layered conductive leads in contact with the antenna and the thermal detector unit, wherein each of the conductive leads comprises a superconductive layer in electrical contact with the thermal detector unit and the antenna, a support layer between the superconductive layer and the substrate, and a buffer layer disposed between the support layer and the superconductive layer, said buffer layer defining a thermal conductivity that is less than one order of magnitude greater than a thermal conductivity defined by the superconductive layer, each of said support layers cooperating to suspend the thermal detector unit over the cavity.

2. The radiation sensor of claim 1 wherein the buffer layer is characterized by a thermal conductivity K<0.1 W/cm-K.

3. The radiation sensor of claim 1 wherein the buffer layer comprises Yttria stabilized Zirconia.

4. The radiation sensor of claim 1 wherein the buffer layer defines a thermal conductivity that is less than a thermal conductivity defined by the superconductive layer.

5. The radiation sensor of claim 1 wherein the superconductive layer is selected from the group consisting of perovskite superconductors.

6. In a radiation sensor for measuring incident radiation comprising a substrate defining a cavity, a thermal detector unit disposed above the cavity, an antenna coupled to the substrate, and a plurality of conductors in contact with the antenna and the thermal detector unit, the improvement comprising:
   each of the plurality of conductors defining a plurality of layers and comprising:
      a superconductive layer;
      a support layer between the superconductive layer and the substrate; and
      a buffer layer between the support layer and the superconductive layer, said buffer layer defining a thermal conductivity that is less than one order of magnitude greater than a thermal conductivity defined by the superconductive layer;
   wherein each of said support layers cooperate to suspend the thermal detector unit over the cavity.

7. In a radiation sensor for measuring incident radiation comprising a substrate defining a cavity, a thermal detector unit disposed above the cavity, an antenna coupled to the substrate, and a plurality of conductors in contact with the antenna and the thermal detector unit, the improvement comprising:
   each of the plurality of conductors defining a multi-layer structure and comprising:
      a support layer adjacent to the substrate;
      a superconductive layer opposite the substrate; and
      a buffer layer between the support layer and the superconductive layer, said buffer layer defining a thermal conductivity K<0.1 W/cm-K;
   wherein each of said support layers cooperate to suspend the thermal detector unit over the cavity.

8. A method for making a radiation sensor comprising:
   defining a cavity within a substrate;
   depositing a filler material within the cavity;
   depositing a thermal detector unit onto the filler material;
   depositing an antenna onto the substrate;
   depositing a plurality of multi-layer conductive leads to contact the thermal detector unit and the antenna, wherein each of the plurality of multi-layer conductive leads defines a layer of superconductive material, a support layer, and a buffer layer therebetween;
   conductively bonding a first segment of the conductive lead to the antenna to form an electrically conductive pathway between the superconductive material and the antenna, and a second segment of the conductive lead to the thermal detector unit so as to form an electrically conductive pathway between the superconductive layer and the thermal detector unit; and removing the filler material such that the support layers suspend the thermal detector unit over the cavity.

9. The method of claim 8 wherein depositing a thermal detector unit comprises depositing a thermally reactive material over at least a portion of the filler material and delineating edges thereof to define the thermal detector unit.

10. The method of claim 8 wherein depositing an antenna onto the substrate comprises depositing a conductive material onto the substrate and delineating edges thereof to define the antenna.

11. The method of claim 8 wherein depositing a plurality of multi-layer conductive leads comprises;

depositing a layer of support material to contact the thermal detector unit and the antenna;

depositing a layer of buffer material over at least a portion of the support material;

depositing a layer of superconductive material over at least a portion of the buffer material; and delineating the plurality of conductive leads by removing at least one of excess support material, excess buffer material, and excess superconductive material.

12. The method of claim 11 wherein depositing a layer of buffer material includes laser depositing with ion beam assist.

13. The method of claim 8 for making an array of radiation sensors, wherein defining a cavity within a substrate comprises defining a plurality of cavities within a substrate;

depositing a filler material within the cavity comprises depositing filler material within the plurality of cavities;

depositing a thermal detector unit onto the filler material comprises depositing at least one thermal detector unit onto the filler material within each cavity;

depositing an antenna onto the substrate comprises depositing at least one antenna onto the substrate for each said cavity;

depositing a plurality of multi-layer conductive leads to contact the thermal detector unit and the antenna comprises, for each thermal detector unit, suspending said thermal detector unit over one cavity with a plurality of the conductive leads that couple the said thermal detector unit to one antenna; and conductively bonding comprises bonding a first and second segment of each conductive lead to one of an antenna and a thermal detector unit.

* * * * *